US006976270B2

(12) United States Patent
Sanchez, II

(10) Patent No.: US 6,976,270 B2
(45) Date of Patent: Dec. 13, 2005

(54) PROCESS AND COMPONENT FOR INQUIRING ABOUT SECURITY RELATIONSHIPS

(75) Inventor: Humberto A. Sanchez, II, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 925 days.

(21) Appl. No.: 09/850,945

(22) Filed: May 8, 2001

(65) Prior Publication Data

US 2002/0169981 A1 Nov. 14, 2002

(51) Int. Cl.[7] ........................ G06F 11/30; G06F 12/14; H04L 9/00; H04L 9/32
(52) U.S. Cl. ........................................ 726/14; 713/167
(58) Field of Search ............................... 713/201, 167; 709/228

(56) References Cited

U.S. PATENT DOCUMENTS 6,237,009 B1 * 5/2001 Waldo et al. ................ 707/206
6,330,677 B1 * 12/2001 Madoukh ..................... 713/200
6,496,511 B1 * 12/2002 Wang et al. ................. 370/401

\* cited by examiner

Primary Examiner—Gilberto Barron, Jr.
Assistant Examiner—Grigory Gurshman

(57) ABSTRACT

A method and software component for inquiring about security relationships is disclosed. The method and software component perform class instantiations and method invocations necessary to retrieve security relationship information for display to a user. The method and software component may perform various manipulations of the security relationship information. The manipulations may comprise eliminating duplicate security relationship information. The method and software component enable a graphical user interface ("GUI") to avoid being cluttered with the necessary coding to retrieve the security relationship information. Instead, the GUI may simply invoke a function of the software component to retrieve the security relationship information.

17 Claims, 14 Drawing Sheets

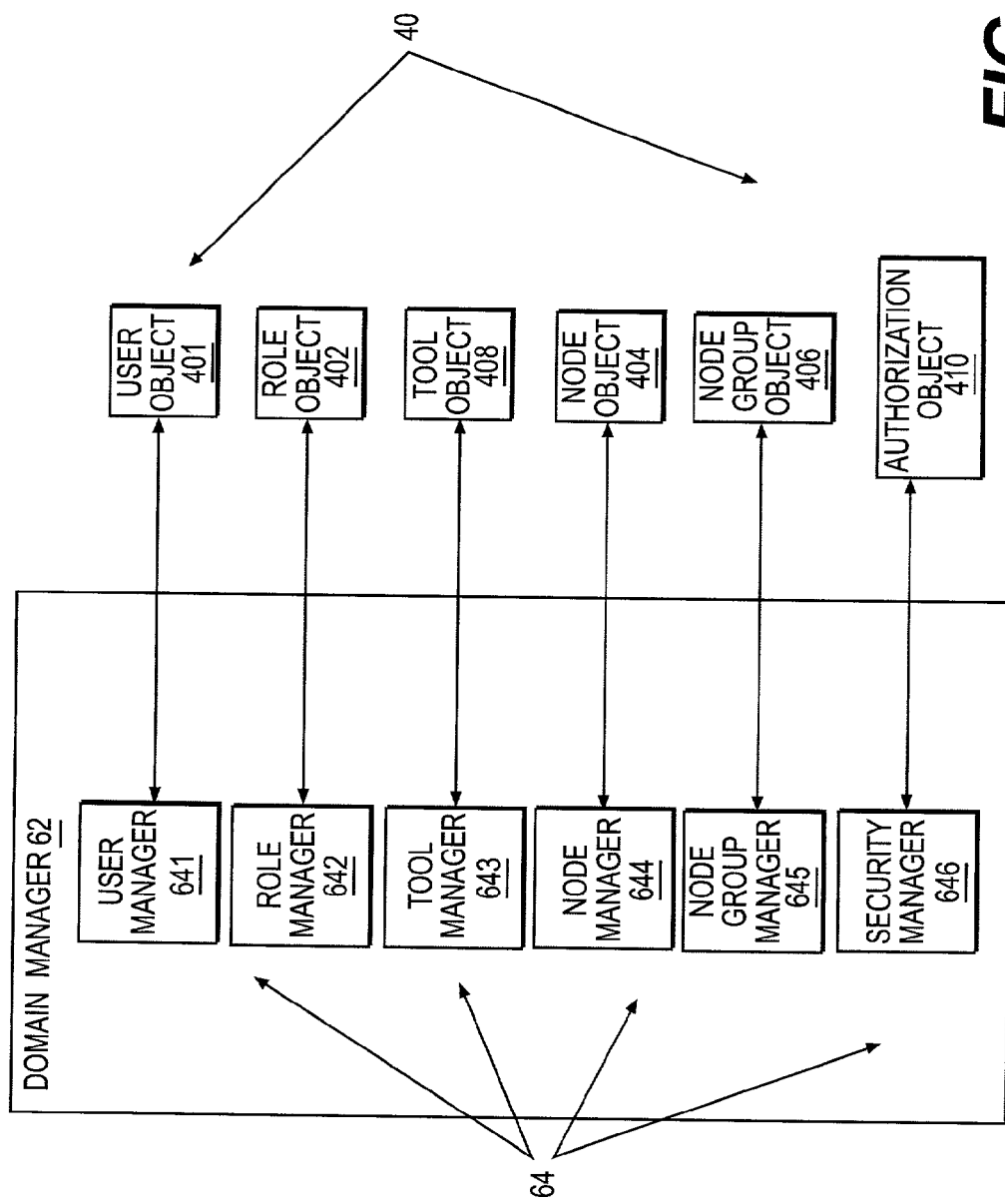

PROCESS AND COMPONENT FOR INQUIRING ABOUT SECURITY RELATIONSHIPS

FIELD OF THE INVENTION

The invention generally relates to system access control security, and particularly relates to determining and displaying a user's allocation of high-level permissions.

BACKGROUND OF THE INVENTION

In many computer systems, there is often a restricted class of users (e.g., root users) that have read and write access (e.g., root access) to the computer systems. Indeed, root users are often the overall administrators of a computer system. As such, root users often have a large number of responsibilities that prevent them from being able to efficiently perform everyday tasks (e.g., managing websites, adding new users, etc.) on the machines of the computer system. In order to increase efficiency, these users must delegate their root access to other users.

Likewise, there may be non-root users that are authorized to perform certain tasks, not requiring root access, on a computer system. These non-root users may delegate their authorization to other users for performing these certain tasks. For example, a database user (dbuser) authorized to perform tasks on a database may delegate its database authorization to another user. Whether delegated root access by a root user or delegated authorization to perform certain tasks by another non-root user, a user needs to be able to determine what levels of access or authorization have been delegated to the user. In other words, the user needs to be able to determine the user's security relationship information.

In order to determine and display the user's security relationship information, prior art graphical user interfaces ("GUIs") used to access prior art computer systems generally have to know which of a plurality of software components maintain the security relationship information. Furthermore, in prior art systems the GUI callback code may need to be coded to perform a substantial number of functions, such as method invocations, class instantiations and other processes, in order to access these software components. Consequently, such prior art GUIs are cluttered with a significant amount of code necessary to perform these functions. Moreover, the software components must be able to be accessed by the GUI, adding to the complexity of the software components.

SUMMARY OF THE INVENTION

A method and apparatus allows users of a computer system to inquire about their security relationships. An embodiment comprises a process and a software component for determining a user's security relationships and passing the security relationship information to a GUI for display, without requiring the GUI to be cluttered with the necessary coding to perform these functions. A software component, according to an embodiment, receives requests from a GUI for a specific user's security relationships and returns the security relationships to the GUI for display to the user.

In an embodiment, objects of an object-oriented programming application represent the security relationships. In this embodiment, a software component interacts with object managers to determine a user's security relationships from the objects. Data retrieved by the object manager from the objects is returned to the software component, which then may pass the data to a GUI for display.

These and other advantages are achieved by a method for inquiring about security relationships, comprising invoking a function of a security relationship component, in response to a user entered command, instantiating an object manager, as directed by the invoked security relationship component function, wherein the object manager enables access to a type of object, retrieving security relationship information by utilizing the object manager, as directed by the invoked security relationship component function, wherein the security relationship information is returned to the security relationship component, and, displaying the security relationship information.

These and other advantages are also achieved by a computer readable medium comprising instructions for inquiring about security relationships, by invoking a function of a security relationship component, in response to a user entered command, instantiating an object manager, as directed by the invoked security relationship component function, wherein the object manager enables access to a type of object, retrieving security relationship information by utilizing the object manager, as directed by the invoked security relationship component function, wherein the security relationship information is returned to the security relationship component, and, displaying the security relationship information.

Likewise, these and other advantages are achieved by a computer system in which security relationships are defined by authorization objects, comprising a memory for storing a software application, a processor on which the software application runs, whereby the software application generates: an object manager that enables access to authorization objects, and, a security relationship component that utilizes the object manager to determine security relationship information from the authorization objects in response to a user entered command.

BRIEF DESCRIPTION OF THE FIGURES

FIG. 3 is a block diagram conceptually additional architectural components of the network system.

DETAILED DESCRIPTION OF THE INVENTION

Figure 1:
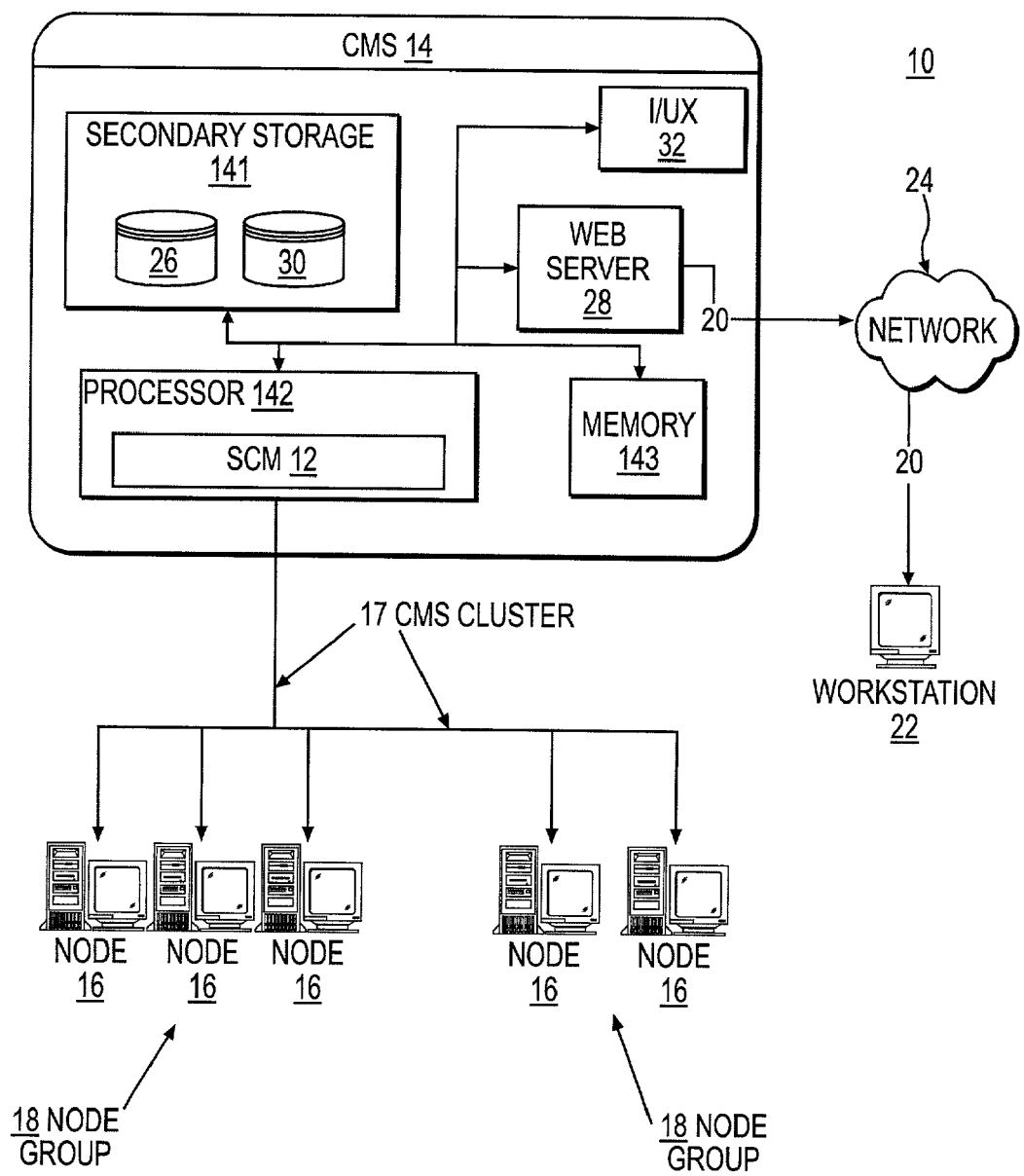
FIG. 1 is a block diagram of a network system of an embodiment.

The present invention may be used with network computer systems in which it is necessary to secure the system and in which only a restricted class of users (e.g., root users) have complete read and write access to the system. FIG. 1 illustrates such a computer system 10 with which the present invention may be used. The computer system 10 comprises a ServiceControl Manager ("SCM") 12 running on a Central Management Server ("CMS") 14 and one or more nodes 16 managed by the SCM 12 on the CMS 14. Together, the one or more nodes 16 managed by the SCM 12 make up a SCM cluster 17. A group of nodes 16 may be organized as a node group 18.

The CMS 14 preferably is an HP-UX 11. x server running the SCM 12 software. The CMS 14 includes a memory 143, a secondary storage device 141, a processor 142, an input device (not shown), a display device (not shown), and an output device (not shown). The memory 143, a computer readable medium, may include, RAM or similar types of memory, which may store one or more applications for execution by processor, including the SCM 12 software. The secondary storage device 141, a computer readable medium, may include a hard disk drive, floppy disk drive, CD-ROM drive, or other types of non-volatile data storage. The processor 142 executes the SCM 12 software and other application(s), which are stored in memory 143 or secondary storage 141, or received from the Internet or other network 24, in order to provide the functions and perform the methods described in this specification, and the processing may be implemented in software, such as software modules, for execution by the CMS 14 and modes 16. The SCM 12 is programmed in Java® and operates in a Java environment. See ServiceControl Manager Technical Reference, HP® part number: B8339-90019, available from Hewlett-Packard Company, Palo Alto, Calif., which is hereby incorporated by reference, for a more detailed description of the SCM 12. The ServiceControl Manager Technical Reference, HP® part number: B8339-90019 is also accessible at http://www.software.hp.com/products/scmgr.

Generally, the SCM 12 supports managing a single SCM cluster 18 from a single CMS 14. All tasks performed on the SCM cluster 18 are initiated on the CMS 14 either directly or remotely, for example, by reaching the CMS 14 via a web connection 20. Therefore, a workstation 22 at which a user sits only needs a web connection 20 over the network 24 to the CMS 14 (or a managed node 16) in order to perform tasks on the SCM cluster 18. The user preferably accesses the SCM cluster 18 through graphical user interfaces ("GUIs") and command-line interfaces ("CLIs"). In addition to the SCM 12 software and the HP-UX server described above, the CMS 14 preferably also comprises a data repository 26 for the SCM cluster 18, a web server 28 that allows web access to the SCM 12, and a depot 30 comprising products used in the configuring of nodes, and a I/UX server 32.

The nodes 16 are preferably HP-UX servers or other servers and they may be referred to as "managed nodes" or simply as "nodes". A node 16 represents a single instance of HP-UX software running on a hardware device. The node 16 may comprise (not shown) a memory, a secondary storage device, a processor, an input device, a display device, and an output device. The CMS 14 itself is preferably also a managed node 16. This is so that multi-system aware ("MSA") tools can be invoked on the CMS 14.

Although the CMS 14 is depicted with various components, one skilled in the art will appreciate that the CMS 14 can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the CMS 14 (and/or the nodes 16) to perform a particular method, such as those described herein.

The SCM 12 is preferably an object-oriented programming application. Object-oriented programming is a method of programming that pairs programming tasks and data into re-usable chunks known as objects. Each object comprises attributes (i.e., data) that define and describe the object. Java classes are meta-definitions that define the structure of a Java object. Java classes when instantiated create instances of the Java classes and are then considered Java objects. Methods within Java objects are called to get or set attributes of the Java object and to change the state of the Java object. Associated with each method is code that is executed when the method is invoked.

Consequently, Java objects preferably provide the functionality of the SCM 12. In the system 10 on which the SCM 12 runs, each user, node, node group, role, tool, authorization, user name, node name, and node group name is, for each instance, represented by a single Java object. A role defines the role (e.g., administrator, database manager, web manager, etc.) a user may have on a certain node(s) or node group(s), where each role has one or more tools associated with it that a user with the role may execute. A tool is an executable that performs a process. An authorization defines the node(s) and node group(s) that the user is authorized to access and what roles the user has on the authorized node(s) or node group(s).

Some objects and classes discussed herein are named with a prefix "mx". The mx prefix is indicative of the application utilizing the objects and classes (e.g., the SCM 12), and is merely exemplary. The names of classes, objects, methods and functions discussed herein are exemplary, are not intended to be limiting, and are merely used for ease of discussion. The terms function and method are used interchangeably herein.

Generally, user access to SCM 12 files is delineated to root users, who have permission to read, write, and execute files and non-root users, who may have limited access to files (e.g., only execute).

In an embodiment, root users allocate permissions to read, write, and execute files to non-root users. Roles comprise certain delineated tasks (e.g., delete a file, write to a file, add a user to the operating system and, modify a database entry) that non-root users are authorized to perform on authorized machines (e.g., nodes 16) for a specific purpose. The tools define the delineated tasks of the roles and comprise coding necessary to perform the tasks. The tools are created for each of the tasks and are then assigned to a role or roles in order to fulfill the purposes of the role or roles. Once a role is created with assigned tools, the role may be authorized for a user to use on one or more machines. Through this authorization, the tools are allocated to users based on authorized roles.

An example of a newly created role may be a database administrator role. A database administrator may need to be able to perform tasks such as adding database entries, deleting database entries, modifying database entries, compiling database entries, and searching database entries. Accordingly, tools that perform these tasks would be created and assigned to the new database administrator role. Certain tools may be useful in a plurality of roles, and therefore, would be assigned to the plurality of roles. Likewise, when a new role is created, existing tools that define and perform the necessary tasks may be assigned to the new role.

Roles are authorized for use in order to allocate tools to the user to give the users root access to a system for a narrow, limited purpose on certain machines (e.g., nodes 16). Continuing with the previous example, the newly created database administrator role may be authorized for a user "Smith" to use on a node 16 named "NODE1". Consequently, the user Smith has the role database administrator on NODE1 and may execute the tools allocated to the user Smith based on the database administrator role on NODE1. In this example, the user Smith does not have the database administrator role on any other node 16, and therefore, cannot execute the tools of the database administrator role on any other node 16 (such as a node 16 named "NODE2"). Likewise, the user Smith only has the database administrator role on NODE1, and therefore, cannot execute any tools, other than those in part of the database administrator role, on NODE 1.

Figure 2:
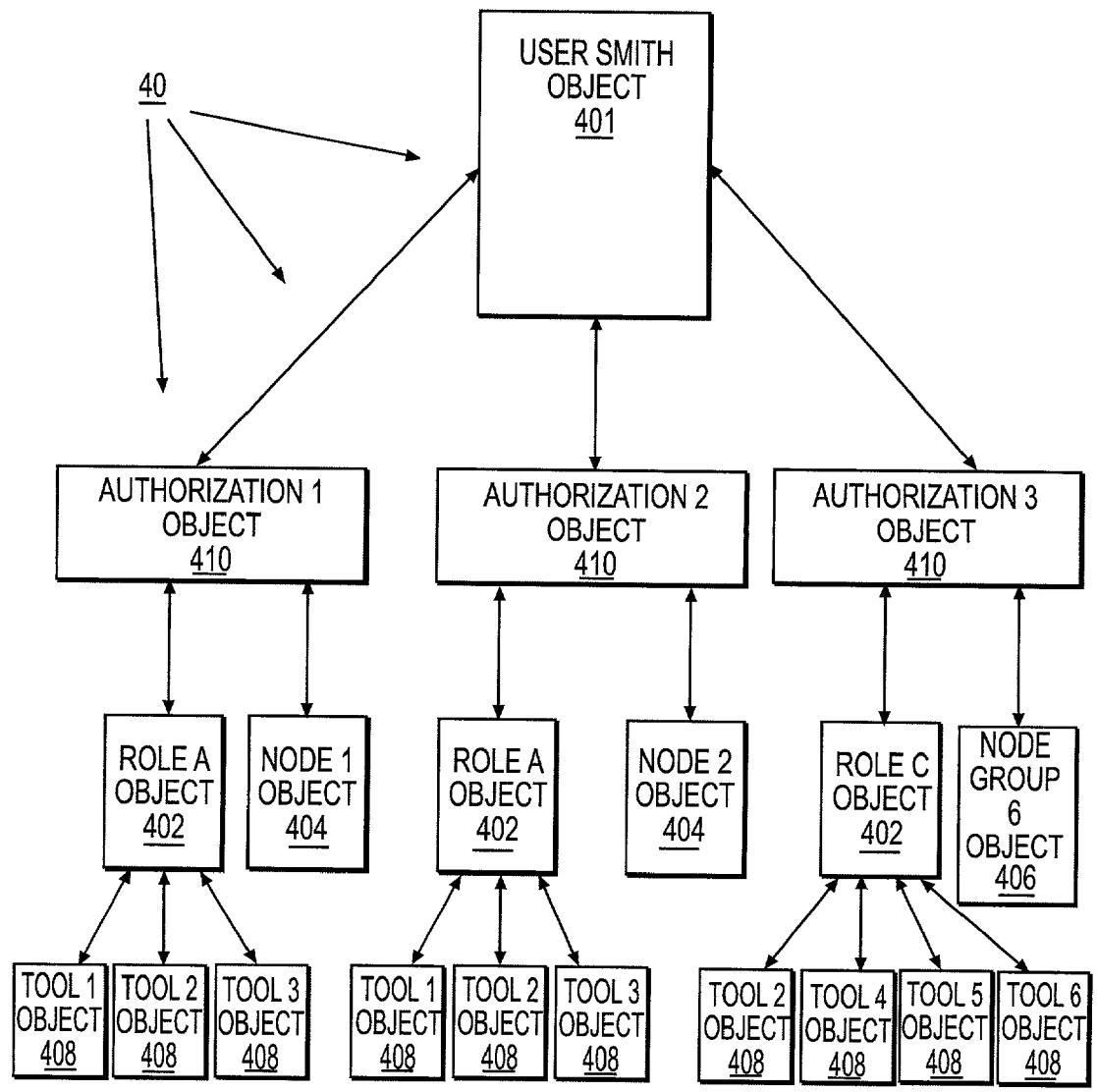
FIG. 2 is a block diagram conceptually illustrating architectural components of the network system.

As illustrated in FIG. 2, users may be authorized to use a role on more than one machine. Likewise, users may be authorized more than one role. FIG. 2 includes user object 401, which represents a user and includes attributes that describe the user. The objects 40, including the user object 401 may be Java objects that are instantiated Java classes running in a Java Virtual Machine on the system 10 described above. When the SCM 12 is running, the objects 40 may be resident in the memory 143 of the CMS 14.

Referring again to FIG. 2, the user object 401 may comprise attributes that define and describe the user. As such, FIG. 2 further illustrates role objects 402, which represent roles for which the user is authorized, node objects 404, which represent the nodes 16 on which the user may utilize the roles, and node group objects 406 that represent the node groups 18 on which the user may utilize the roles. Each role object 402 may comprise attributes that define and describe a role. FIG. 2 also shows tool objects 408 that represent tools assigned to the various roles and that are allocated to the user represented by the user object 402 based on the authorized roles. The tool objects 408 may comprise attributes that identify the roles assigned the tools.

A user's authorization to utilize various roles and tools on certain nodes 16 or node groups 18 may be maintained by authorization objects 410. Authorization objects 410 comprise attributes that define the role or roles, for which the user is authorized, and the node, nodes or node groups on which the user is authorized to utilize the assigned role or roles. Accordingly, FIG. 2 also illustrates authorization objects 410 that define the roles and nodes 16 and/or node groups 18 for which the user is authorized. In an embodiment, the authorization objects 410 for each role and node for which the user is authorized may be created. Since these authorization objects 410 link the user to a role and a node 16 or node group 18, they may be referred to as authorization "triplets".

In order to provide access to and management of these various objects, the SCM 12 preferably comprises one or more domain managers 62 and, housed within each domain manager 62, a plurality of object managers 64, as shown in FIG. 3. Preferably one domain manager 62 exists for every domain in the system 10. Likewise, there is preferably one object manager 64 exists for each type of object 40, except for object name objects (e.g., user name object, node name object, role name object, tool name object, node group name object). Accordingly, FIG. 3 illustrates the following object managers 64: a user manager 641, a role manager 642, a tool manager 643, a node manager 644, a node group manager 645 and a security manager 646 (for authorization objects 410). The object managers 64, among other things, are used to access the objects 40 of the SCM 12 in order to determine the user's authorized roles, the nodes (and node groups) on which the user is authorized to use the roles and the tools that the user can use on these nodes (i.e., the tools associated with the user's roles). The relationships between the user, the user's authorized roles, nodes and tools are collectively referred to as the user's security relationships. The objects 40 that need to be accessed to determine these security relationships may include, at least, the user, node, role, tool, node group, role name, tool name, node name and node group name objects.

When a non-root user accesses (e.g., from a workstation 22) the SCM 12, for example, in order to perform tasks on the SCM cluster 18, the user can only use the roles that the user is authorized to use. Likewise, the user can only use these roles on the nodes (and node groups) for which the roles are authorized. Moreover, the user can only use the tools associated with the roles.

Figure 4A:
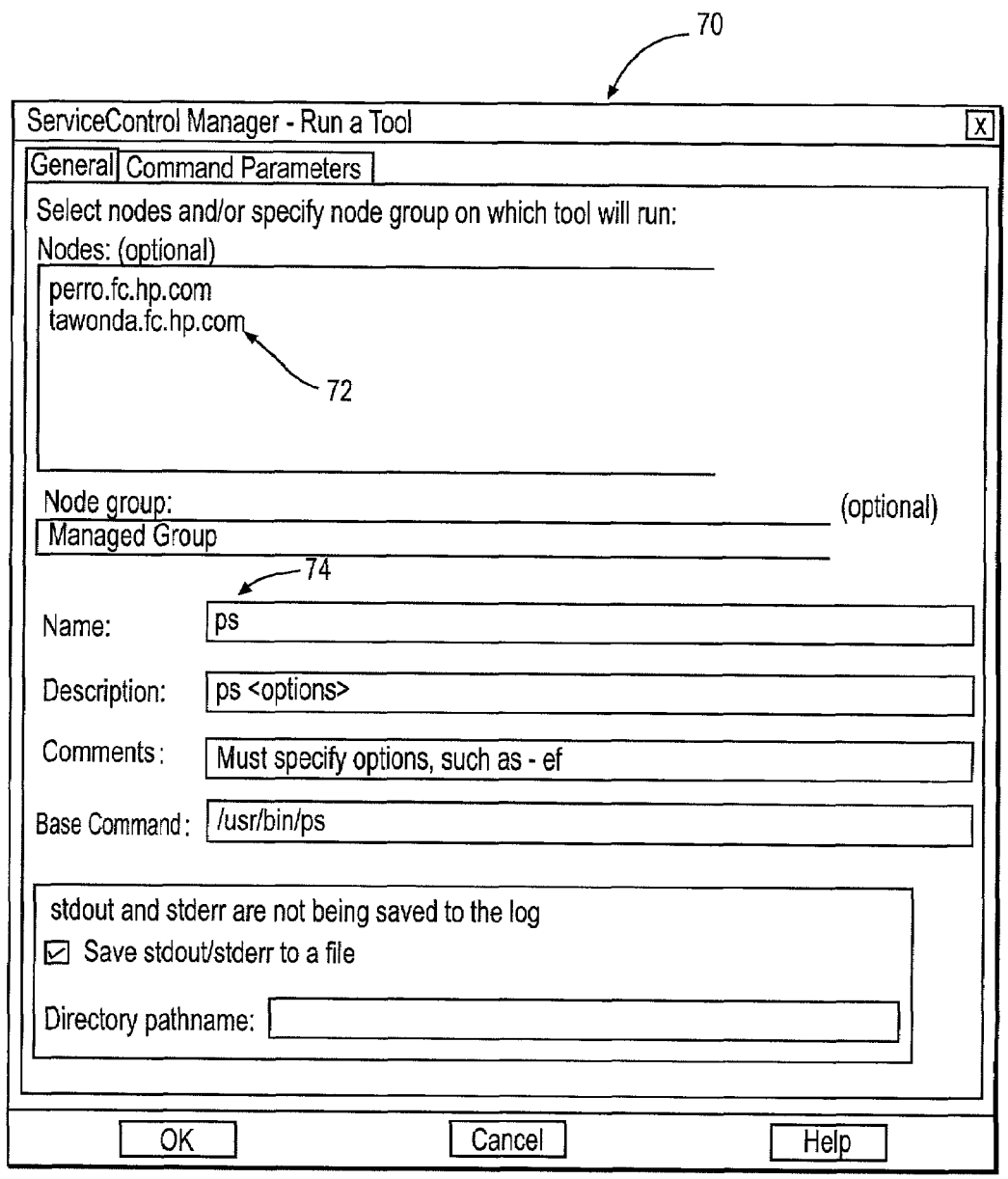
FIGS. 4a and 4b are diagrams of a graphical user interface used with the network system.
Figure 4B:
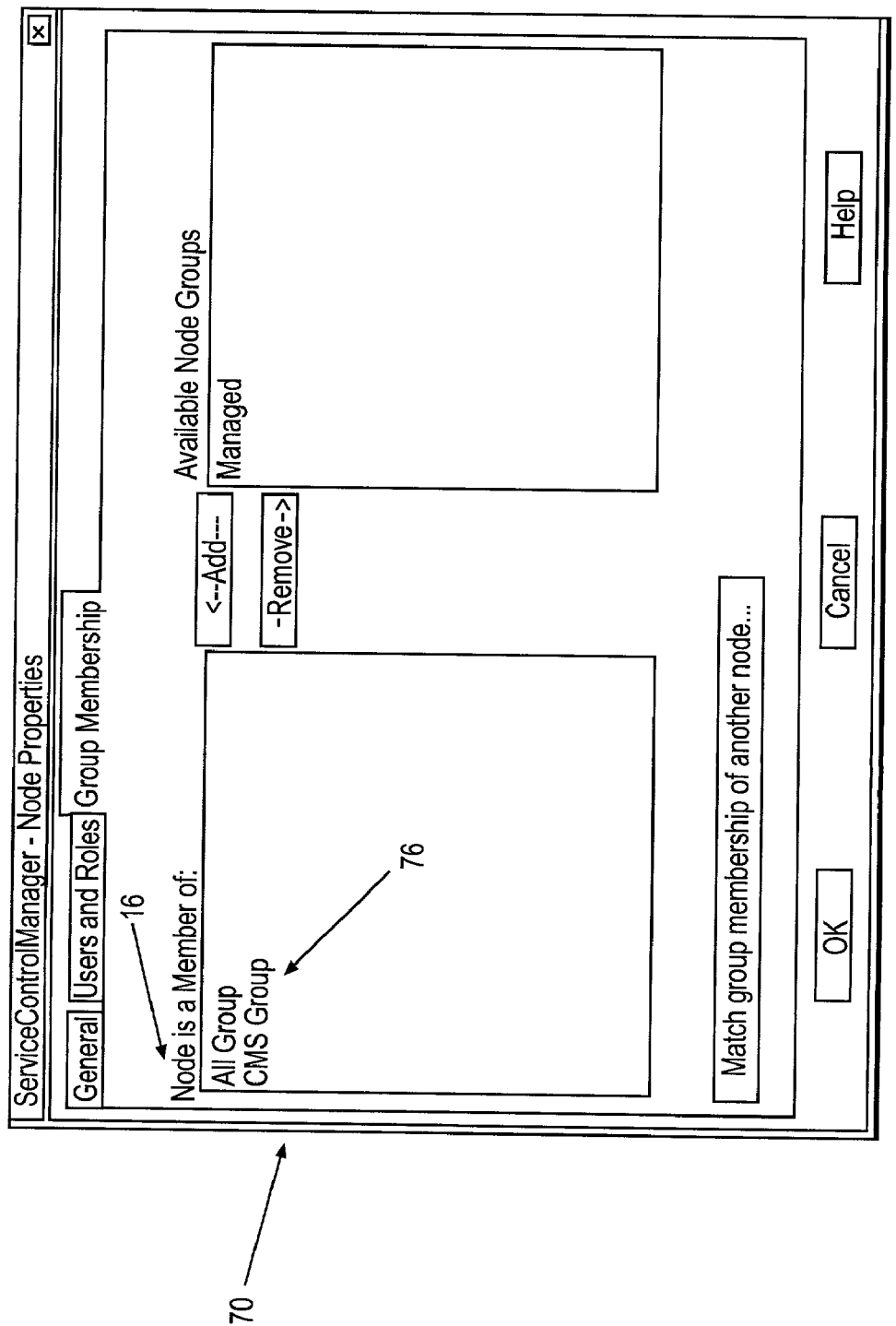

Preferably, the user is only presented with the authorized roles, nodes and tools to choose from when accessing the SCM 12. As illustrated in FIGS. 4a and 4b, a GUI 70 presents an exemplary user of the SCM 12 with the user's roles, nodes and tools (i.e., the user's security relationships). When the user starts-up the GUI 70 and requests information about the user's security relationships, callback code of the GUI 70 is executed to determine and present the user's security relationships, as described below. FIG. 4a illustrates the GUI 70 displaying the names 72 of nodes 16 on which the user can run a tool 74. The GUI 70 may display this information, for example, after execution of a process shown in FIG. 8 and described below.

FIG. 4b illustrates the GUI 70 displaying names 76 of node groups 18 to which a node 16 ("node") belongs. The GUI 70 shown in FIG. 4b may display this information, for example, after execution of a process shown in FIG. 9 and described below. As noted above, the object managers 64 are used to access the objects 40 in order to determine the user's security relationships. Including the coding to access the object managers 64, for all of the objects 40 necessary for determining the security relationships, in the callback code of the GUI 70 clutters the GUI 70 and complicates execution of the callback code.

Figure 5:
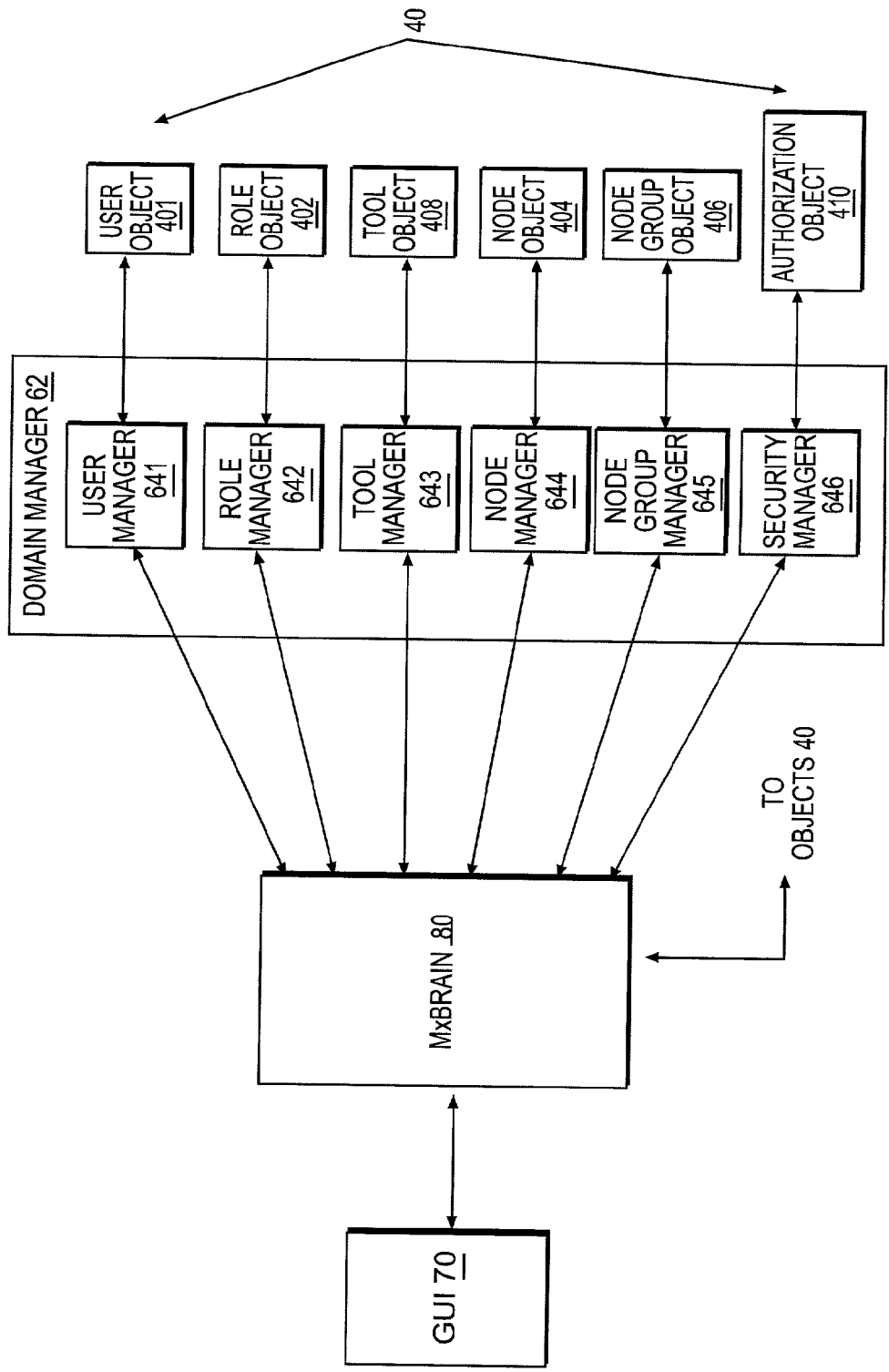
FIG. 5 is a block diagram conceptually illustrating an embodiment of a software component for inquiring about security relationships.

Accordingly, illustrated in FIG. 5, is a security relationship component 80 for inquiring about security relationships. The component 80, referred to herein as the MxBrain, preferably includes coding for accessing the object managers 64 and objects 40 in order to determine the user's security relationships. As shown in FIG. 5, the GUI 70 accesses the MxBrain 80, which in turn accesses the object managers 64 and the objects 40, in order to determine the user's security relationships. The MxBrain 80 preferably comprises functions or methods that are each coded with a process of various method invocations, remote method invocations ("RMIs") and/or class instantiations for accessing the object managers 64 and the objects 40 to determine a user's security relationships. For example, the MxBrain functions may include a function for determining a user's authorized roles. These functions are preferably invoked by executed callback code of the GUI 70 (e.g., when the GUI 70 starts-up). The objects 40 and the object managers 64 preferably return the security relationship information to the MxBrain 80, which may perform additional operations on the security relationship information before returning the security relationship information to the GUI 70 for display to the user. The directional arrows between the various components in FIG. 5 depict this flow of information.

Figure 6:
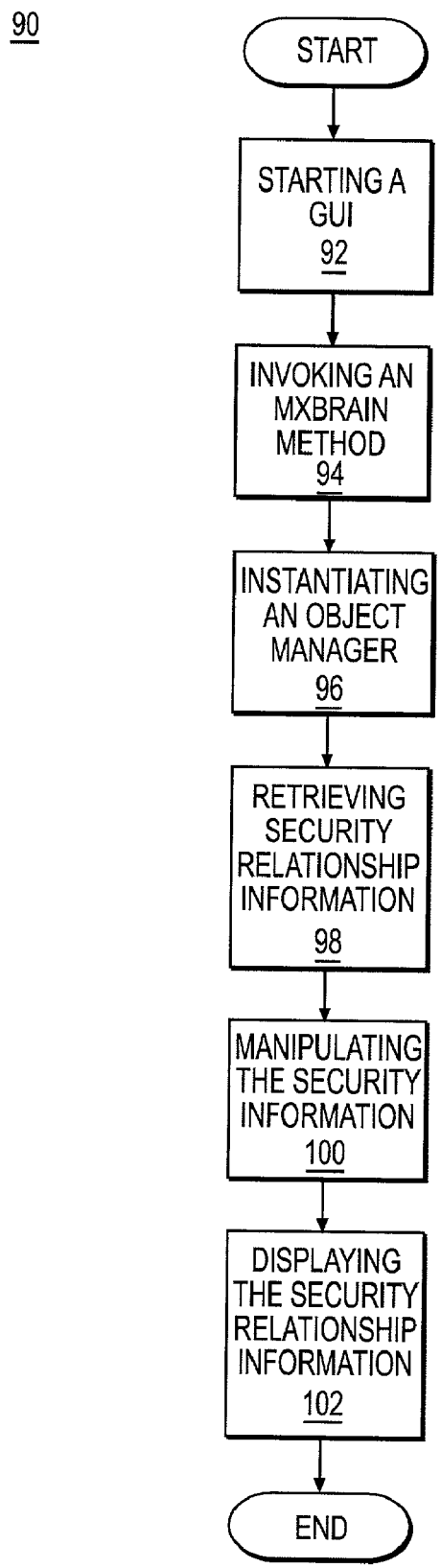
FIG. 6 is a flowchart illustrating an embodiment of a process for inquiring about security relationships.

FIG. 6 is a flowchart illustrating an exemplary method 90 for inquiring about security relationships. The method 90 comprises starting a GUI 92, invoking a MxBrain function 94, instantiating an object manager 96, retrieving security relationship information 98, manipulating the security information 100, and displaying the security relationship information 102. Starting the GUI 92 preferably comprises the user starting the GUI 70 in order to access a system such as the system 10 of FIG. 1 and software such as the SCM 12.

As noted above, when the user starts the GUI 70 in order to access the SCM 12, the GUI 70 preferably displays the user's security relationships. Accordingly, invoking the MxBrain function 94 preferably comprises the GUI 70 executing the callback code, which in turn invokes the MxBrain 80 function to determine the security relationships of the user. For example, in order to determine the user's authorized tools, the callback code invokes a MxBrain function, the getToolNamesForUser method.

As noted above, the object managers 64 are accessed to determine the user's security relationships. Accordingly, instantiating the object manager 96 preferably comprises the MxBrain 80 accessing the object manager(s) necessary for determining the security relationships, as directed by the invoked MxBrain function. For example, in order to determine a user's authorized tools, the security manager 646 and the tool manager 643 are instantiated (as directed by the invoked getToolNamesForUser method). The security manager 646 and tool manager 643, and the other object managers 64, may be located locally near the MxBrain 80 (e.g., the MxBrain 80 may be housed in the domain manager 62 with the object managers 64). If the object managers 64 are located remotely from the MxBrain 80, the object manager 64 may be accessed with a remote method invocation ("RMI").

The MxBrain functions comprise a process of various method invocation(s), remote method invocation(s) ("RMIs") and/or class instantiation(s) for determining the user's security relationships. Accordingly, retrieving security relationship information 98 preferably comprises execution of the invoked MxBrain function is process and utilization of the instantiated object manager(s) 64 to retrieve the security relationship information. The invoked MxBrain function's process, and therefore the retrieving step 98, preferably includes invocation of one or more object manager 64 methods and/or object 40 methods. The object manager 64 methods may in turn instantiate one or more objects 40 and invoke one or more object/object manager 40 methods.

As part of the retrieving step 98, once the object manager 64 retrieves the security relationship information, the object manager 64 returns the security relationship information to the MxBrain 80. The MxBrain 80 may then enter the security relationship information in a hash table or vector, or other storage mechanism (e.g., for further processing). Accordingly, manipulating the security relationship information 100 may comprise the MxBrain 80 storing the security relationship information in a hash table or vector and processing the security relationship information (e.g., with previously retrieved security relationship information). For example, if the returned security relationship information includes tool Id numbers identifying the user's authorized tools, the MxBrain 80 may store the tool Id numbers in a hash table and then use the stored tool Id numbers to determine the tool names from the tool name objects.

Likewise, if the MxBrain 80 is retrieving the authorized nodes for all of a user's tools, the manipulating step 100 may comprise comparing the authorized nodes for one tool to the authorized nodes for another tool so as to eliminate repeated nodes. The MxBrain 80 may accomplish this comparison by writing the retrieved security relationship information to a hash table in which new entries overwrite duplicate old entries.

Displaying the security relationship information 102 preferably comprises the MxBrain 80 returning the security relationship information to the GUI 70 and the GUI 70 displaying the security relationship information. Preferably, the GUI 70 displays names of the roles, nodes, node groups, and/or tools of the user.

FIGS. 7–13 are sequence diagrams illustrating exemplary executions of the method 90 for inquiring about security relationships. All of the sequence diagrams include a series of classes 112, vertical time-lines 114 indicating running of the classes 112 from which they descend, horizontal method (or function) call-lines 116 running from the vertical time-line 114 of the class 112 invoking the method to the vertical time line 114 of the target class 112, and notations 118 providing comments.

Figure 7:
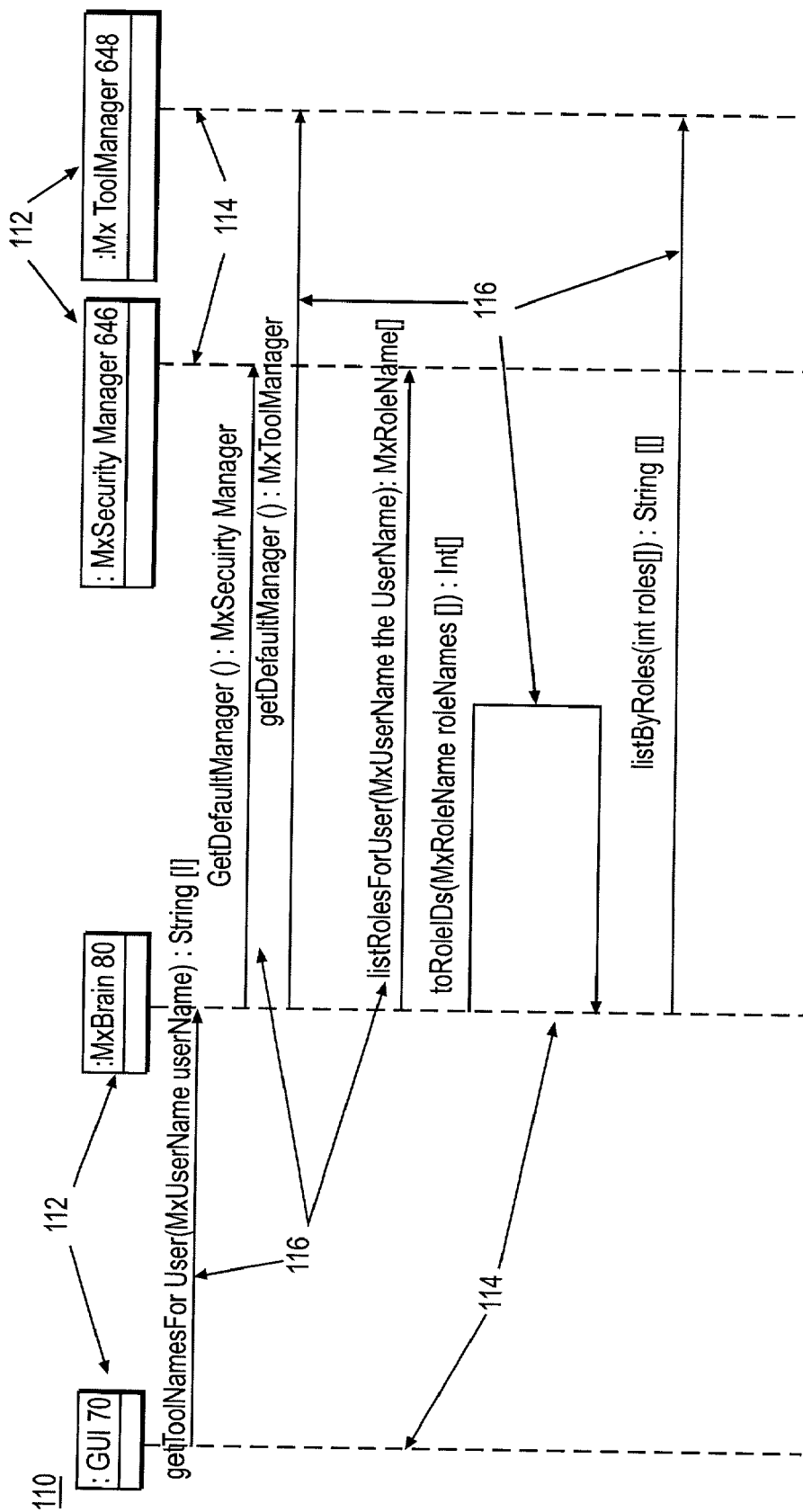
FIGS. 7–13 are sequence diagrams illustrating exemplary applications of the component and process inquiring about security relationships.

FIG. 7 is a sequence diagram 110 illustrating a process for getting the user's authorized tools. In the sequence diagram 110, the GUI 70 executes callback code that in turn invokes a getToolNamesForUser method of the MxBrain 80. As seen by the associated method call-line 116, the GUI 70 passes the name of the current user ("userName") with the getToolNamesForUser method invocation. The invoked getToolNamesForUser method directs the MxBrain 80 to instantiate the security manager 646 and the tool manager 643, shown by getDefaultManager( ): MxSecurityManager and getDefaultManager( ): MxToolManager method call-lines 116 running from the MxBrain class 112 to the MxSecurityManager and MxToolManager classes 112.

Since a user is allocated tools based on the user's authorized roles, the MxBrain 80 determines the user's roles in order to determine the user's tools. As shown by the listRolesForUser method call-line 116, the MxBrain 80 invokes a security manager 646 method to list the authorized roles of the user identified by the username. The security manager 646 returns the role names of the user's authorized roles to the MxBrain 80. As shown by the self-referential toRoleIDs method call-line 116, the MxBrain 80 makes a self-referential method invocation to convert the returned role names to role Id numbers.

The MxBrain 80 then takes the role Id numbers and invokes a tool manager 643 method to list the tools allocated to the user by the user's authorized roles. This invocation is shown by the listByRoles method call-line 116, which illustrates the passing of the role Id numbers ("int roles"). The tool manager 643 returns the tools allocated to the user by role. The GUI 70 then preferably displays these allocated tools to the user (not shown). Since the authorized roles were also retrieved, they may also be displayed to the user.

Figure 8:
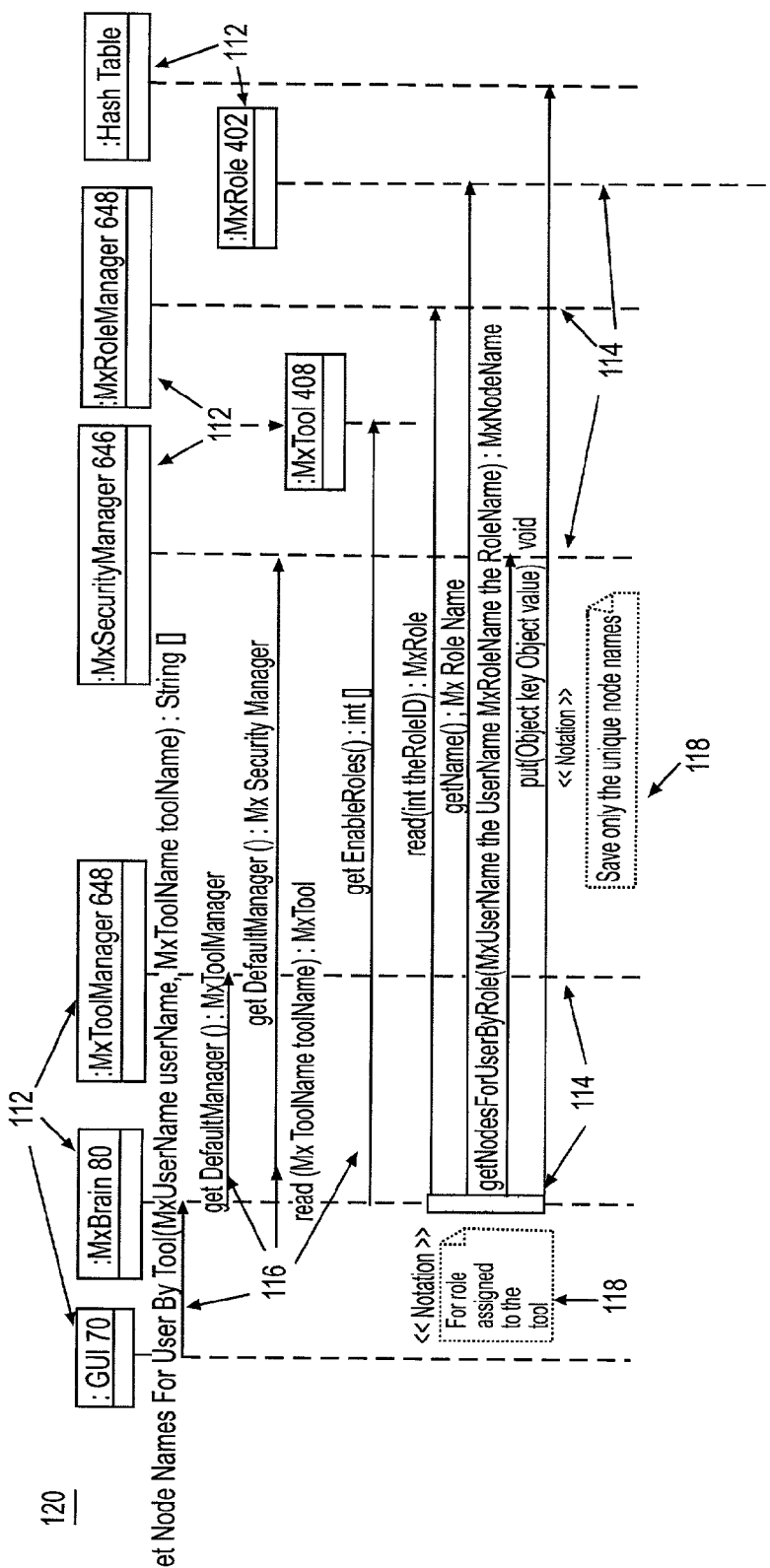

FIG. 8 is a sequence diagram 120 illustrating a process for getting names of the node(s) 16 on which a user may use an allocated tool. For example, if the GUI 70 has displayed the user's allocated tools, and the user selects an allocated tool, the process shown by the sequence diagram 120 may be executed in order to display the node(s) 16 on which the user can execute the selected tool. The GUI 70 invokes a getNodeNamesForUserByTool MxBrain 80 method, passing the username and the name of the allocated tool ("toolName"). The MxBrain 80, as directed by the invoked getNodeNamesForUserByTool method, instantiates the tool manager 643 and the security manager 646. As shown by the read(MxToolName toolName): MxTool method call-line 116, the MxBrain 80 invokes a tool manager 643 method to read the tool object 408 ("MxTool") for the allocated tool. The MxBrain 80 uses the tool object 408 to determine the assigned role(s) for the allocated tool, as shown by the getEnabledRoles method call-line 116. The tool object 408 returns the role Id number(s).

For each assigned role for the allocated tool, the MxBrain 80 queries the role manager 642 for the role object 402 ("MxRole") identified by the role id number, as shown by the read(int theRoleID): MxRole. The MxBrain 80 may then determine the name of the role object 402, as shown by the getName method call-line 116 on an MxRole class 112. The MxBrain 80 preferably then queries the security manager 646 for the nodes 16 authorized for the user by the assigned role identified by the preceding steps. This is shown by the getNodesForUserByRole method call line 116. The returned node names may be placed in a hash table (shown by the "hash table" class 112), as shown by the put method call-line 116.

These method calls (read(int theRoleID): MxRole, get-Name, getNodesForUserByRole, and put) are repeated for each assigned role identified by the getEnabledRoles method invocation, as indicated by the thickened vertical timeline 114 descending from the MxBrain class 112. Since a user may be authorized more than one role on a node 16 and a tool may be assigned more than one role, there may be repetitive nodes returned by the getNodesForUserByRole method invocations. As noted by the notation 118, the put method only saves the unique node names in the hash table. Once the illustrated method calls have been repeated for each assigned role, the node names in the hash table are returned to the GUI 70 for display to the user.

Figure 9:
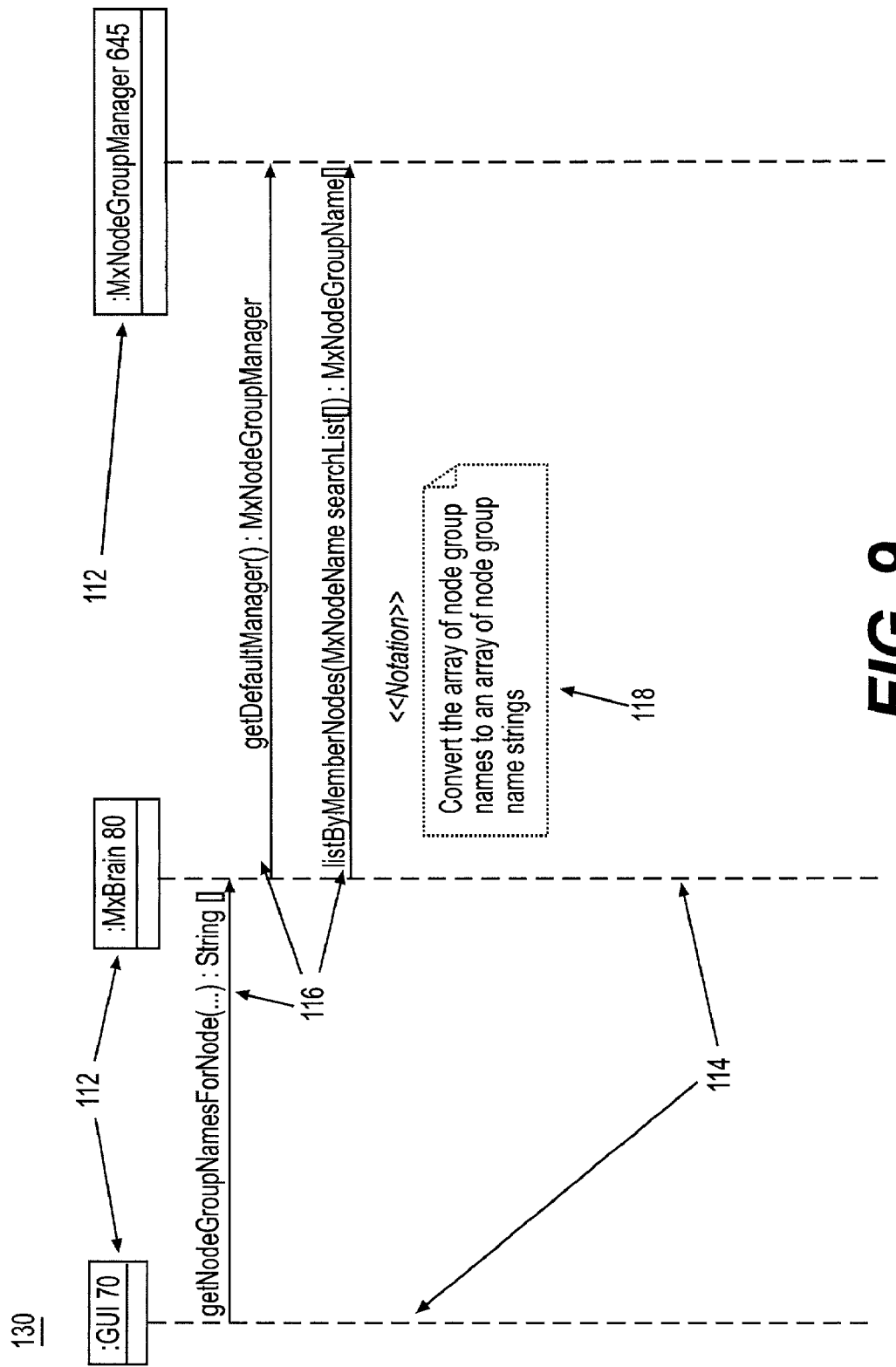

FIGS. 9–13 are additional sequence diagrams illustrating exemplary executions of the method 90 for inquiring about security relationships. The processes shown in FIGS. 9–13 are self-evident and are not described in detail herein. FIG. 9 is a sequence diagram 130 illustrating a process for determining node group names from provided node 16 names. For example, if the nodes 16 on which a user is authorized to execute allocated tools have been determined (e.g., from the process shown in FIG. 8), the node groups 18, if any, comprised of any of these nodes may be determined for display on the GUI 70 per the sequence diagram 130.

Figure 10:
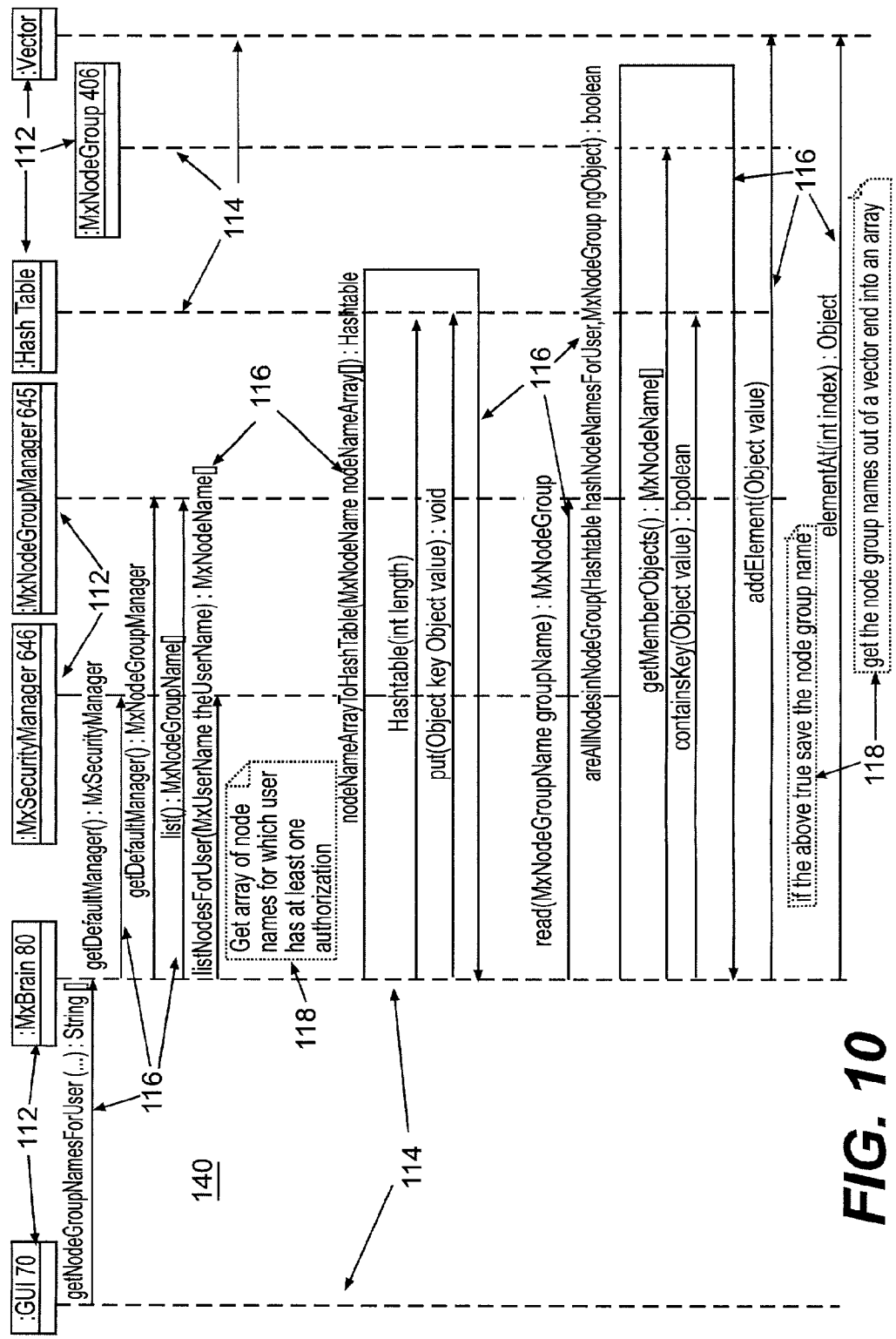

FIG. 10 is a sequence diagram 140 illustrating a process for determining node group names. In an embodiment, given a user, the MxBrain 80 determines all the nodes 16 for which the user has an authorization triplet (e.g., nodes on which the user is authorized to use a role). From the determined list of nodes 16, the MxBrain 80 determines which subset of the nodes 16 make up the node group 18. For example, a user "hasii" has authorization triplets for nodes 1 through 10. Nodes 4 through 7 comprise the entire node group "WebServer". If hasii is authorized to execute a tool or tools on all three nodes 4–7, then hasii has a node group authorization for node group WebServer. As opposed to FIG. 9, the authorized nodes 16 and/or tools of the user are not determined prior to execution of the process shown in the sequence diagram 140. Instead, the sequence diagram 140 shows a determination of the user's authorized node groups 18.

Figure 11:
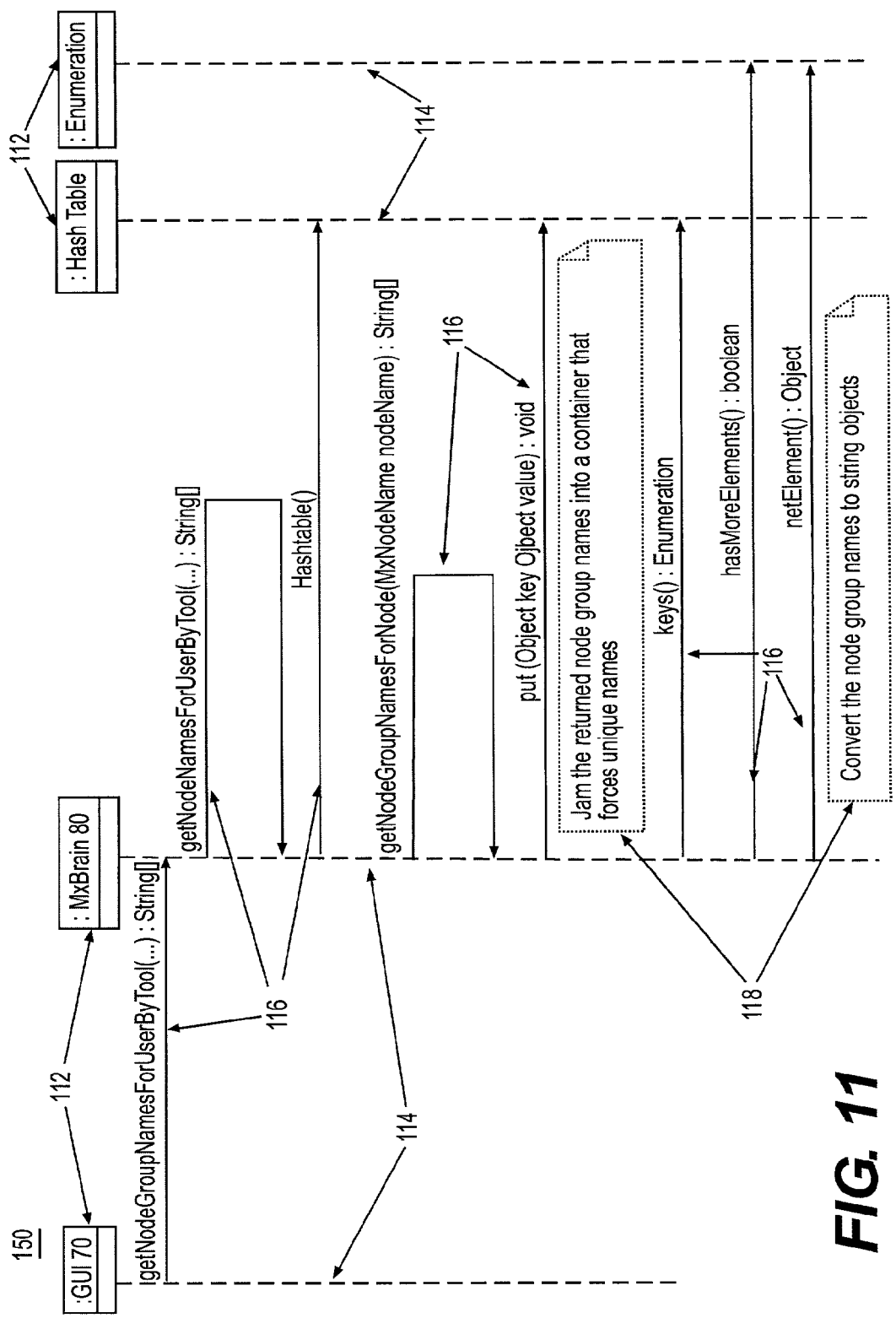

FIG. 11 is a sequence diagram 150 illustrating a process for determining node group names for a user for an authorized tool. For example, if the tools that the user is allocated have been determined (e.g., from the process shown in FIG. 7) the node groups on which any of these tools may be executed may be determined for display on the GUI 70 per the sequence diagram 140.

FIG. 11 illustrates an enumeration class 112, and the invocation of enumeration class methods. An enumeration is an object that encapsulates a collection of objects. Another object or data structure, such as a hashtable or vector, may provide a mechanism to return their entire contents (e.g., the entire contents of the hashtable or vector). The enumeration object is that mechanism. The mechanism is utilized by requesting the first object encapsulated by the enumeration object and then continuing to request the "next" object until the enumeration object has no more objects to provide. The enumeration object may not provide the encapsulated objects in a particular order.

If, alternatively, the user's authorized node groups 18 are saved as part of the authorization triplets as authorization objects 410, then the authorized node groups 18 may be determined even more directly, in a process similar to that shown in FIG. 8.

Figure 12:
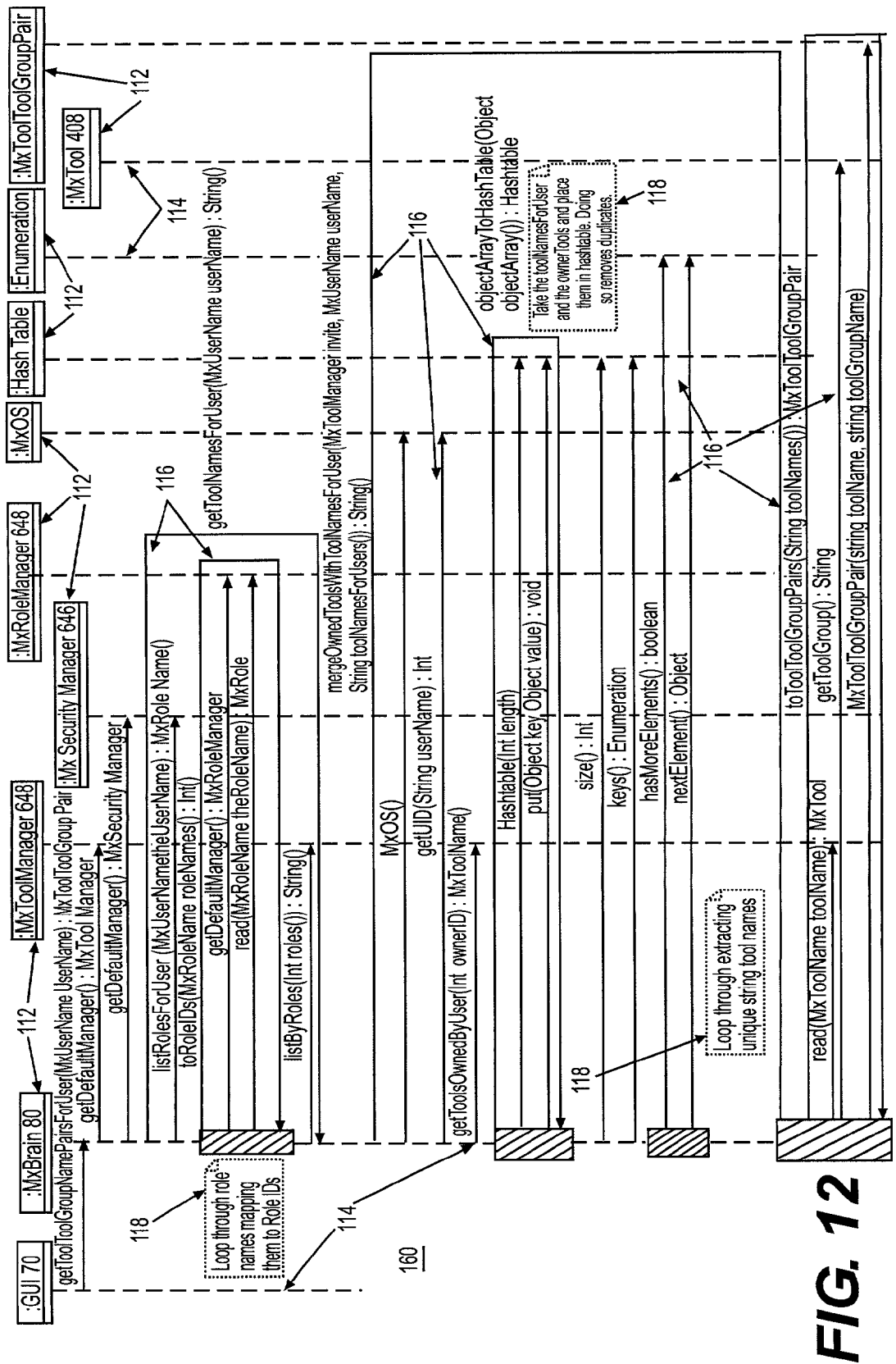

FIG. 12 is a sequence diagram 160 illustrating a process for determining tool group names for a user. Tools may be grouped into logical tool groups for easier display on the GUI 70. Accordingly, the process shown by the sequence diagram 160 may be used when the GUI 70 displays the tool groups that the user is authorized to use.

Figure 13:
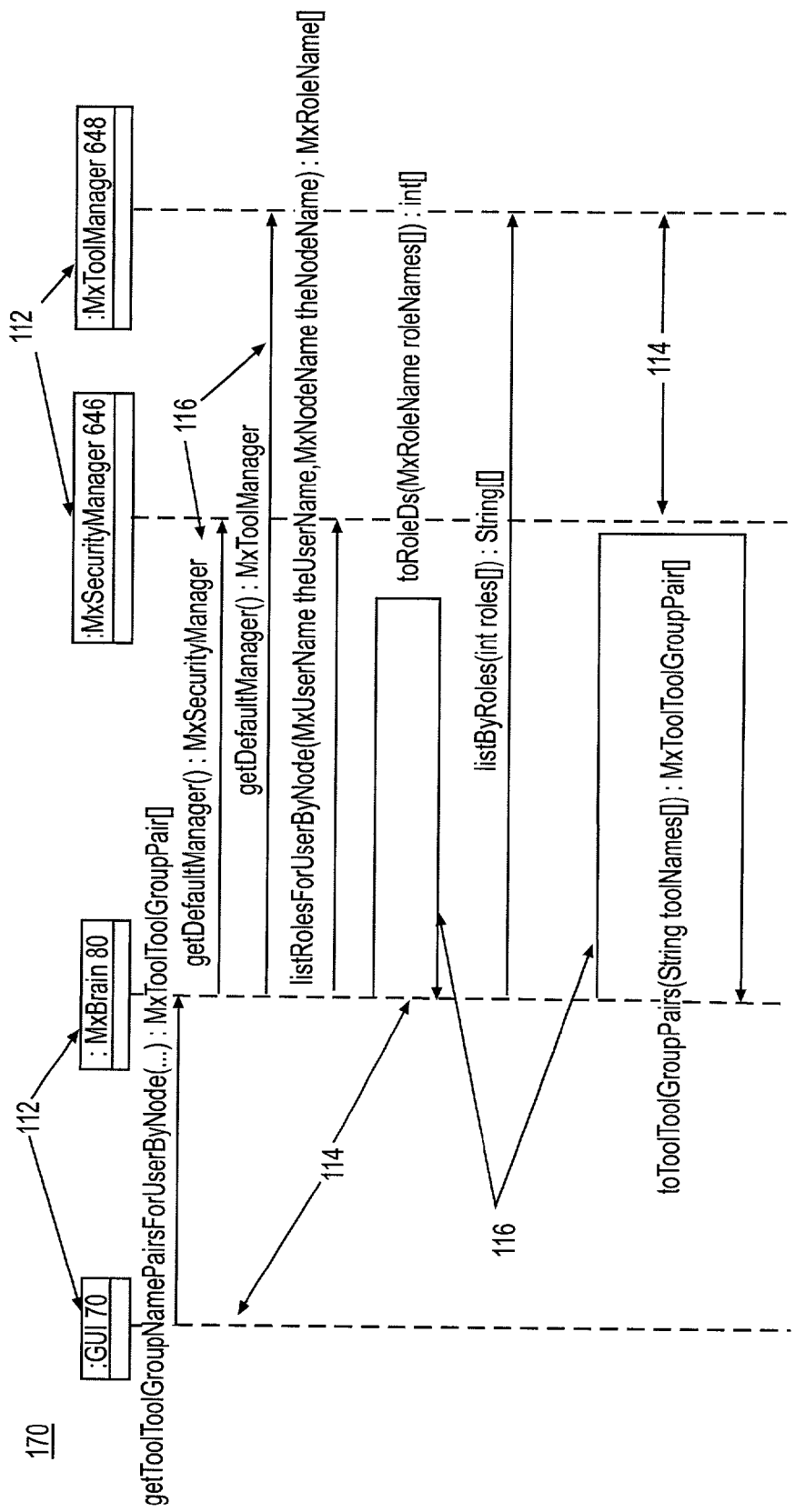

Likewise, FIG. 13 is a sequence diagram 170 illustrating a process for determining tool group names for a user for an authorized node. The process shown by the sequence diagram 170 may be used when the user's authorized nodes have been determined (e.g., as shown in FIG. 8). The process shown by the sequence diagram 170 will return the tool groups if any of tools allocated for the user on the authorized node.

It is noted that there may be additional processes for determining a user's security relationships, beyond those shown in FIGS. 7–13. The processes shown in FIGS. 7–13 are merely meant to be illustrative and exemplary and are not meant to be exhaustive.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. Those skilled in the art will recognize that these and other variations are possible within the spirit and scope of the invention as defined in the following claims and their equivalents.

What is claimed is:

1. A method for inquiring about security relationships, comprising:
    invoking a function of a security relationship component, in response to a user entered command;
    instantiating an object manager, as directed by the invoked security relationship component function, wherein the object manager enables access to a type of object;
    retrieving security relationship information by utilizing the object manager, as directed by the invoked security relationship component function, wherein the security relationship information is returned to the security relationship component; and,
    displaying the security relationship information, wherein the type of object is an authorization object that defines a node or nodes on which a user is authorized to run an executable, and wherein the retrieving step comprises the object manager accessing authorization objects to determine the authorized node or nodes of the user.

2. The method of claim 1, further comprising:
    manipulating the security relationship information, as directed by the invoked security relationship component function, wherein the manipulated security relationship information is displayed by the displaying step.

3. The method of claim 2, wherein the manipulating step comprises eliminating duplicate security relationship information.

4. The method of claim 3, wherein the eliminating step comprises adding the security relationship information to a hash table, whereby duplicate entries in the hash table are overwritten.

5. The method of claim 1, wherein the security relationship component function comprises class instantiations, method invocations and/or remote method invocations ("RMIs").

6. The method of claim 1, wherein the retrieving step comprises invoking an object manager method.

7. The method of claim 1, wherein the retrieving step comprises invoking an object method.

8. A computer readable medium comprising instructions for inquiring about security relationships, by:
   invoking a function of a security relationship component, in response to a user entered command;
   instantiating an object manager, as directed by the invoked security relationship component function, wherein the object manager enables access to a type of object;
   retrieving security relationship information by utilizing the object manager, as directed by the invoked security relationship component function, wherein the security relationship information is returned to the security relationship component; and,
   displaying the security relationship information, wherein the type of object is an authorization object that defines a node or nodes on which a user is authorized to run an executable, and wherein the retrieving step comprises the object manager accessing authorization objects to determine the authorized node or nodes of the user.

9. The computer readable medium of claim 8, wherein the instructions further inquire about security relationships by:
   manipulating the security relationship information, as directed by the invoked security relationship component function, wherein the manipulated security relationship information is displayed by the displaying step.

10. The computer readable medium of claim 8, wherein the manipulating step comprises eliminating duplicate security relationship information.

11. The computer readable medium of claim 10, wherein the eliminating step comprises adding the security relationship information to a hash table, whereby duplicate entries in the hash table are overwritten.

12. The computer readable medium of claim 8, wherein the security relationship component function comprises class instantiations, method invocations and/or remote method invocations ("RMIs").

13. The computer readable medium of claim 8, wherein the retrieving step comprises invoking an object manager method.

14. The computer readable medium of claim 8, wherein the retrieving step comprises invoking an object method.

15. A computer system in which security relationships are defined by authorization objects, comprising:
   a memory for storing a software application; and
   a processor on which the software application runs, whereby the software application generates:
      an object manager that enables access to authorization objects;
      a security relationship component that utilizes the object manager to determine security relationship information from the authorization objects in response to a user entered command; and
   nodes, wherein the security relationship information defines on which nodes the user may execute executables.

16. The computer system of claim 15, wherein the security relationship component comprises one or more methods that are invoked by the user command.

17. The computer system of claim 16, wherein the security relationship methods comprise class instantiations, method invocations, and/or remote method invocations ("RMIs").

* * * * *